(12) United States Patent  (10) Patent No.: US 7,303,335 B2
Kato et al.  (45) Date of Patent: Dec. 4, 2007

(54) LINEAR-MOTION DEVICE AND METHOD OF MANUFACTURING THE SAME

(75) Inventors: Soichiro Kato, Saitama (JP); Takumi Nakagawa, Saitama (JP); Naoki Inokai, Gunma (JP); Kazuo Kanazawa, Gunma (JP)

(73) Assignee: NSK Ltd., Tokyo (JP)

( * ) Notice: Subject to any disclaimer, the term of this patent is extended or adjusted under 35 U.S.C. 154(b) by 222 days.

(21) Appl. No.: 10/317,119

(22) Filed: Dec. 12, 2002

(65) Prior Publication Data

US 2004/0232299 A1  Nov. 25, 2004

(30) Foreign Application Priority Data

Dec. 13, 2001 (JP) ............ P. 2001-380527
Dec. 18, 2001 (JP) ............ P. 2001-384844
Dec. 27, 2001 (JP) ............ P. 2001-398490

(51) Int. Cl.
*F16C 29/06* (2006.01)
(52) U.S. Cl. .......................... 384/45; 384/43
(58) Field of Classification Search ........... 384/43, 384/44, 45
See application file for complete search history.

(56) References Cited

U.S. PATENT DOCUMENTS

| | | | |
|---|---|---|---|
| 3,353,875 A | | 11/1967 | Karge |
| 4,391,473 A | | 7/1983 | Teramachi |
| 4,478,462 A | * | 10/1984 | Teramachi .......... 384/45 |
| 4,620,751 A | * | 11/1986 | Teramachi .......... 384/44 |
| 4,648,726 A | | 3/1987 | Katahira |
| 4,662,763 A | * | 5/1987 | Itoh .................. 384/45 |
| 4,692,037 A | * | 9/1987 | Kasai ................ 384/44 |
| 4,869,600 A | * | 9/1989 | Tonogai ............. 384/43 |
| 5,281,029 A | * | 1/1994 | Morita ............... 384/8 |

(Continued)

FOREIGN PATENT DOCUMENTS

DE  26 18 535  * 11/1977

(Continued)

OTHER PUBLICATIONS

The Random House Dictionary, Revised edition, pp. 582 & 676, copyright 1980.*

(Continued)

*Primary Examiner*—William C. Joyce
(74) *Attorney, Agent, or Firm*—Sughrue Mion, PLLC

(57) ABSTRACT

A linear-motion device has: a slider provided onto a guide rail relatively movably; and a plurality of rolling elements for causing the slider to move relatively in a longitudinal direction of the guide rail; whereby the slider comprising a slider block having rolling-element rolling grooves that oppose to rolling-element rolling grooves formed on the guide rail, and end caps that close both-end openings of the rolling-element rolling paths formed between the rolling-element rolling grooves on the slider block and the rolling-element rolling grooves on the guide rail, and rolling-element return paths for returning the rolling elements, which have rolled in the rolling-element rolling paths, are formed on the slider block, wherein the rolling-element return paths comprises a groove portion formed on an outer surface of the slider block along the longitudinal direction of the guide rail, and a cover member for covering the groove portion.

11 Claims, 15 Drawing Sheets

U.S. PATENT DOCUMENTS 5,454,645 A 10/1995 Tsukada
5,774,988 A 7/1998 Hattori
6,558,039 B2 * 5/2003 Wu ............................ 384/45

FOREIGN PATENT DOCUMENTS

| EP | 0 443 098 A1 | 11/1990 |
| EP | 0 857 883 A1 | 8/1998 |
| EP | 1 308 641 A1 | 5/2003 |
| JP | 58-34225 * | 2/1983 |
| JP | 60-143225 * | 7/1985 |
| JP | 5-133417 * | 5/1993 |
| JP | 2002-155935 * | 5/2002 |

OTHER PUBLICATIONS

Japanese Abstract No. 60231014, dated Nov. 16, 1985.
Japanese Abstract No. 58034225, dated Feb. 28, 1983.
Japanese Abstract No. 03113117, dated May 14, 1991.
Japanese Abstract No. 2002155935, dated May 31, 2002.

* cited by examiner

LINEAR-MOTION DEVICE AND METHOD OF MANUFACTURING THE SAME

BACKGROUND OF THE INVENTION

1. Field of the Invention

The present invention relates to a method of manufacturing a linear-motion device employed in a common industrial machine, a transferring machine, etc.

In particular, the present invention relates to a linear-motion device employed in an XY table unit, or the like, for example.

The present invention also relates to a slider of a linear-motion guide bearing unit in which a configuration of a slider block is improved, and a linear-motion guide bearing unit constituting a linear guide having this slider and employed in a machine tool, an industrial machine, etc.

2. Description of the Related Art

A configuration of the linear-motion guide bearing unit will be explained while taking an example.

The linear-motion guide bearing unit has the guide rail that extends in the axial direction and has an almost square sectional shape, and the slider that is fitted to this guide rail and has a substantially U-shaped sectional shape. The rolling-element rolling grooves are formed on both side surfaces of the guide rail in two columns, four columns, or the like in total in the axial direction.

Also, the slider comprises the slider block and the end caps fitted to both end portions of the slider block in the axial direction. In addition, the side seals for sealing the openings of the clearance between the guide rail and the slider are fitted to both end portions of the slider (end surfaces of respective end caps).

Further, the slider block has the rolling-element rolling grooves, which oppose to the rolling-element rolling grooves of the guide rail, on the inner side surfaces of both sleeve portions, and also has the rolling-element return paths, which pass through the thick positions of the sleeve portions in the axial direction. Then, the rolling-element rolling paths are constructed by both opposing rolling-element rolling grooves Meanwhile, the end cap has the curved path that communicates the rolling-element rolling path with the rolling-element return path that is formed in parallel with the rolling-element rolling path. The rolling-element circulation paths are constructed by the rolling-element rolling paths, the rolling-element return paths, and the curved paths provided to both ends. A large number of rolling elements made of the steel balls, for example, are charged in the rolling-element circulation paths.

The slider fitted to the guide rail are moved smoothly along the guide rail via rolling operations of the rolling elements in the rolling-element rolling paths. The rolling elements are rolled in the rolling-element circulation paths in the slider during the movement and are infinitely circulated.

In such linear-motion guide bearing unit in the prior art, the rolling elements held in the retainer are charged into the rolling-element circulation paths and then the slider is fitted to the guide rail.

In the linear-motion guide bearing unit, the tongue portion that picks up the rolling elements from the rolling-element rolling path to feed to the curved path is provided in the end cap. In this case, if the linear-motion guide bearing unit is assembled as mentioned above (if the slider is fitted to the guide rail in the situation that the rolling elements have already been charged in the rolling-element circulation paths), the rolling elements are moved in zigzags and thus come into contact with the tongue portion when the rolling elements pass through near the tongue portion, and thus there is a possibility that the tongue portion is subjected to the damage (see FIG. 8).

Also, the above assembling method has a first problem that, when the slider is fitted to the guide rail, the rolling elements are ready to fall off from the slider.

In addition, an appropriate amount of rolling elements must be charged into the rolling-element circulation paths. But it is difficult to check whether or not a charged amount of rolling elements is the appropriate amount.

Further, in case the rolling elements are charged into the rolling-element circulation paths while interposing the spacers between the rolling elements, it is difficult to check whether or not the spacers are interposed between the rolling elements without fail.

On the other hand, normally the linear-motion device employed in the XY table unit, or the like comprises the guide rail, the slider provided onto this guide rail, and a large number of rolling elements used to cause this slider to move relatively in the longitudinal direction of the guide rail. Then, the slider has the slider block having the rolling-element rolling grooves that oppose to the rolling-element rolling grooves formed on the guide rail, and the end caps that close both-end openings of the rolling-element rolling paths formed between the rolling-element rolling grooves on this slider block and the rolling-element rolling grooves on the guide rail. The rolling-element return paths for returning the rolling elements, which have rolled in the rolling-element rolling paths, are formed in parallel with the rolling-element rolling paths.

By the way, in the prior art, if the rolling-element return paths are formed on the slider block of such linear-motion device, the rolling-element rolling grooves are formed on inner side surfaces of the slider block by applying the drawings process to the slider block and then the rolling-element return paths are formed by applying the drilling process to the slider block.

However, if the rolling-element return paths are formed on the slider block according to such method, there is a second problem such that the surface undulation precision of the inside of the rolling-element return paths is bad and the surfaces of the rolling elements that roll in the rolling-element return paths are easily spoiled. Also, according to the above method, it is difficult to form the rolling-element return paths on the slider block by one step. Thus, since at least two steps are needed to form the rolling-element return paths, much cost and time are needed.

Further more, the slider of the linear-motion guide bearing unit, which is fitted to the guide rail that extends linearly, has a plurality of ball circulation paths to extend over the slider block and the end caps coupled to both ends of the slider block respectively. Respective ball circulation paths consist of the rolling-element rolling paths and the rolling-element return paths formed in the end caps in parallel with each other, and the coupling ball rolling portions formed in both end caps to connect both ends of both ball rolling portions. A large number of steel balls that cause the slider to move relatively along the guide rail are charged in the ball circulation paths.

In the prior art, the rolling-element return paths are formed by elongate holes that pass through the slider block. Since a number of balls roll in the through holes, inner surfaces of the through holes must be formed smoothly.

Since the through holes opened in the slider block are elongate, much time and labor to open the through holes are required. Therefore, this third problem acts as one cause of high cost of the slider or the linear-motion guide bearing unit having the slider.

SUMMARY OF THE INVENTION

Therefore, the present invention has been made to overcome the above first problem in the prior art, and it is a subject of the present invention to provide a method of manufacturing a linear-motion device capable of making charging of rolling elements easy and eliminating a possibility that the rolling elements are fallen off during assembling and a possibility that a tongue portion is damaged during assembling.

In order to overcome the above subject, the present invention is constructed as follows. That is, a method of manufacturing a linear-motion device having steps of: preparing: a guide rail having rolling-element rolling grooves on outer surfaces thereof, the rolling-element rolling grooves extending in an axial direction of the guide rail; a slider having rolling-element rolling grooves disposed so as to be opposed to the rolling-element rolling grooves of the guide rail, and a rolling-element introducing port opened on an outer surface of the slider so as to communicate with rolling-element circulation paths that are constructed by rolling-element rolling paths formed of both rolling-element rolling grooves, and rolling-element return paths coupled to both end portions of the rolling-element rolling paths via curved paths, and fitted to the guide rail relatively movably in the axial direction thereof; and, a plurality of rolling elements circulated while rolling in the rolling-element circulation paths; introducing the rolling elements into the rolling-element circulation paths from the rolling-element introducing port after the slider is fitted to the guide rail; and closing the rolling-element introducing port.

According to such configuration, since the rolling elements are charged from the rolling-element introducing port, the charging operation of the rolling elements becomes very easy. Also, since the operation for fitting the slider, in which the rolling elements have already been charged into the rolling-element circulation path, to the guide rail is not executed, there is no chance that the rolling elements are fallen off during the assembling. In addition, since the rolling elements are charged after the slider is fitted to the guide rail, there is no possibility that the tongue portion is subjected to the damage in the assembling operation.

Also, a method of manufacturing a linear-motion device set forth in a second aspect according to the present invention comprises steps of: preparing: a guide rail having rolling-element rolling grooves on outer surfaces thereof, the rolling-element rolling grooves extending in an axial direction of the guide rail; a slider having rolling-element rolling grooves disposed so as to be opposed to the rolling-element rolling grooves of the guide rail, and a rolling-element introducing port opened on an outer surface of the slider so as to communicate with rolling-element circulation paths that are constructed by rolling-element rolling paths formed of both rolling-element rolling grooves, and rolling-element return paths coupled to both end portions of the rolling-element rolling paths via curved paths, and fitted to the guide rail relatively movably in the axial direction thereof; a plurality of rolling elements circulated while rolling in the rolling-element circulation paths; and, a provisional guide rail having a same outer shape as the guide rail; fitting the slider to the provisional guide rail relatively movably in the axial direction thereof; introducing the rolling elements into the rolling-element circulation paths from the rolling-element introducing port; closing the rolling-element introducing port; disposing the provisional guide rail and the guide rail in such a manner that respective end portions thereof come into contact with each other or are positioned close to each other such that the provisional guide rail and the guide rail are continued in the axial direction; and moving the slider from the provisional guide rail to the guide rail.

According to such configuration, since the rolling elements are charged from the rolling-element introducing port, the charging operation of the rolling elements becomes very easy. Also, since the operation for fitting the slider, in which the rolling elements have already been charged into the rolling-element circulation path, to the guide rail is not executed, there is no chance that the rolling elements are fallen off during the assembling. In addition, if the slider in which the rolling elements have already been charged is shifted from the provisional guide rail to the guide rail, the rolling elements are moved not in zigzags but smoothly. Therefore, there is no possibility that the tongue portion is subjected to the damage when the rolling elements pass through near the tongue portion.

In the method of manufacturing a linear-motion device set forth in a third aspect according to the present invention, in the method of manufacturing a linear-motion device according to the first aspect or the second aspect, the rolling elements are charged into the rolling-element circulation paths in excess of 90% in length thereof.

If the rolling elements are charged merely into the portion that is below 90% of the rolling-element circulation paths in length, the number of the rolling elements becomes insufficient. Therefore, it is possible that the vibration is increased and the operability of the guide bearing unit becomes worse.

In the method of manufacturing a linear-motion device set forth in a fourth aspect according to the present invention, in the method of manufacturing a linear-motion device according to any one of the first to third aspects, spacers are interposed between the rolling elements.

According to such configuration, even if the rolling elements are charged into the rolling-element circulation paths while interposing the spacers between the rolling elements, the charging operation can be facilitated. Also, it can be checked via the rolling-element introducing port at the time of the charging operation whether or not the spacers are interposed surely between the rolling elements.

Therefore, the present invention has been made to overcome the second problem in the prior art, and it is a subject of the present invention to provide a linear-motion device capable of forming rolling-element return paths without application of the drilling process to a slider block.

In order to overcome the above subject, the invention set forth in a fifth aspect provides a linear-motion device having: a slider provided onto a guide rail relatively movably; and a plurality of rolling elements for causing the slider to move relatively in a longitudinal direction of the guide rail; whereby the slider having a slider block having rolling-element rolling grooves that oppose to rolling-element rolling grooves formed on the guide rail, and end caps that close both-end openings of the rolling-element rolling paths formed between the rolling-element rolling grooves on the slider block and the rolling-element rolling grooves on the guide rail, and rolling-element return paths for returning the rolling elements, which have rolled in the rolling-element rolling paths, are formed on the slider block, wherein the rolling-element return paths comprises a groove portion formed on an outer surface of the slider block along the longitudinal direction of the guide rail, and a cover member for covering the groove portion.

In the invention as set forth in a sixth aspect, in the linear-motion device according to the fifth aspect, a guide plate is provided in a center portion of the groove portion in such a manner that at least two rolling-element return paths are formed in the groove portion.

In addition to this, it is a subject of the present invention to provide a slider of a linear-motion device capable of improving workability of a slider block and having a low cost, and a linear-motion device.

In the invention of the fifth aspect, both the rolling-element rolling paths and the rolling-element return paths formed in the slider block are not constructed by the holes that pass through the slider block, but both portions are constructed by the grooves. Therefore, not only the process of forming the rolling-element rolling paths in the slider block but also the process of forming can be made easy.

In embodying the invention of the fifth aspect, it is preferable that, in order to omit the cutting process to shape both ball rolling portions, the product shaped by the drawing process should be employed as the slider block. In addition, it is preferable that the rolling-element rolling paths should be provided to be opened to the surface of the rail fitting recess of the slider block or the rolling-element return paths should be provided to be opened to the surface of the slider block, which does not face to the rail fitting recess.

In addition, in embodying the invention of the fifth aspect, it is preferable that, if the separator portion is formed of different member from the slider block, both ends of the separator should be coupled to the end caps. It is preferable that, in order to prevent the mistake in the assembling posture of the separator, the separator should be provided to extend between both end caps by fitting coupling holes, which are provided to end portions of the separator and one of the end caps, and coupling convex portions, which are provided to other of the end caps.

Further, in embodying the invention of the fifth aspect, it is preferable that, in order to arrange the separator firmly at a proper position, the fitting coupling holes extend in a thickness direction of the slider block, coupling convex portions extend over a shorter distance than lengths of the coupling holes in a same direction as the coupling holes, and fitting between the coupling holes and the coupling convex portions should be set tightly in a width direction of the slider block not to move the separator in its width direction. Also, the separator may be formed of synthetic resin. In addition, it is preferable that, in order to reduce the number of maintenance times to feed the grease to the balls, the separator should be formed of oil-impregnated material.

DETAILED DESCRIPTION OF THE PREFERRED EMBODIMENTS

Embodiments of a linear-motion device manufacturing method according to the present invention will be explained in detail with reference to the drawings hereinafter. In this case, in respective subsequent drawings, same symbols are affixed to same or equivalent portions.

Figure 1:
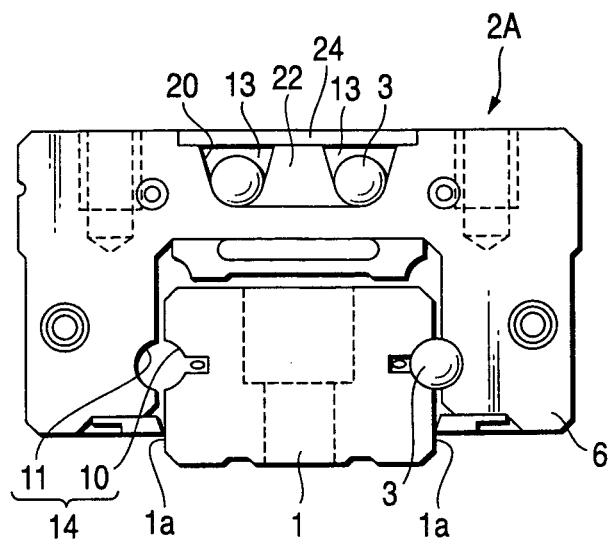
FIG. 1 is a front view showing a configuration of a linear-motion device.
Figure 2:
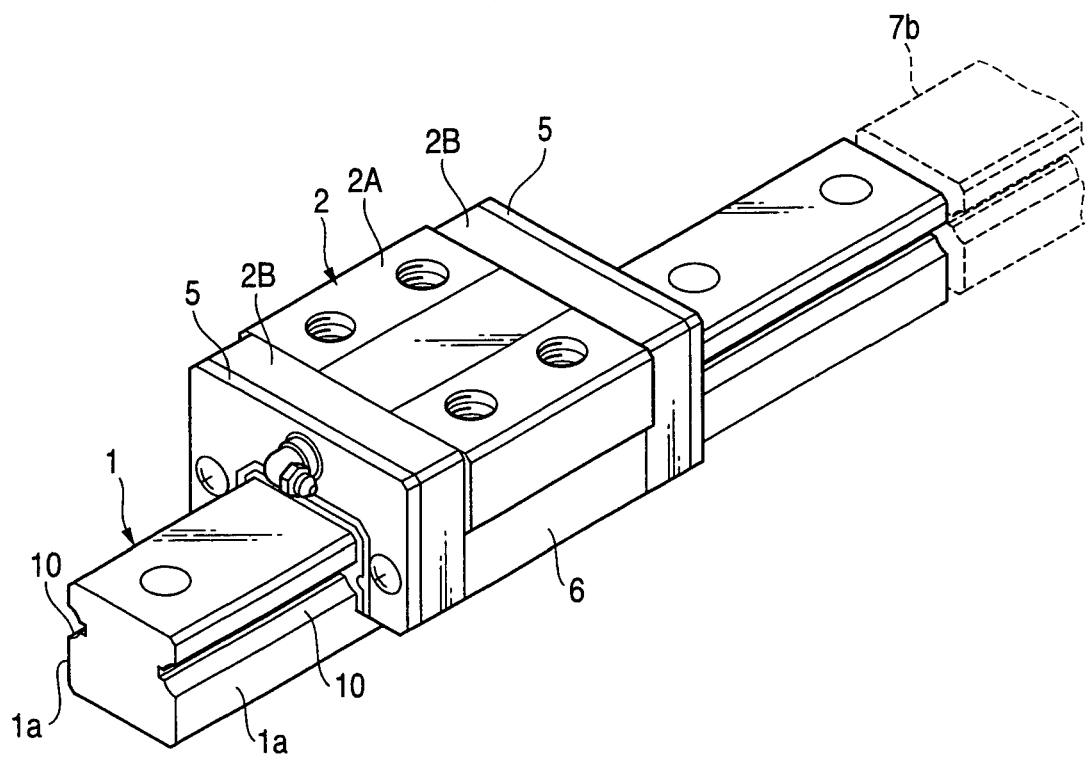
FIG. 2 is a perspective view of the linear-motion device in FIG. 1.

FIG. 1 a front view showing a linear-motion device to explain a first embodiment of the linear-motion device manufacturing method according to the present invention (this view is viewed from the axial direction, and illustration of end caps and side seals is omitted herein). FIG. 2 is a perspective view of the linear-motion device in FIG. 1.

First, a configuration of the linear-motion device will be explained hereunder.

Rolling-element rolling grooves 10, 10 each consisting of a concave groove, which extends in the axial direction and has an almost semicircular sectional shape, are formed in an intermediate position between both side surface 1*a*, 1*a* of a guide rail 1 that extends in the axial direction and has an almost square sectional shape. A slider 2 that has a substantially u-shaped sectional shape is fitted onto this guide rail 1 relatively movably in the axial direction.

This slider 2 comprises a slider block 2A and end caps 2B, 2B that are detachably attached to both end portions of the slider block in the axial direction. Then, side seals 5, 5 for sealing openings of a clearance between the guide rail 1 and the slider 2 are fitted to both end portions of the slider 2 (end surfaces of respective end caps 2B). Also, rolling-element rolling grooves 11, 11 each consisting of a concave groove, which has an almost semicircular sectional shape, are formed in the center portions of inner side surfaces of both sleeve portions of the slider block 2A so as to oppose to the rolling-element rolling grooves 10, 10 of the guide rail 1. In this case, the side seals 5, 5 may not be fitted as the case may be.

Then, rolling-element rolling paths 14, 14 each having an almost circular sectional shape are constructed by the rolling-element rolling grooves 10, 10 of the guide rail 1 and the rolling-element rolling grooves 11, 11 of both sleeve portions. These rolling-element rolling paths 14, 14 extend in the axial direction. In this case, alignment of the rolling-element rolling grooves 10, 11 provided to the guide rail 1 and the slider 2 is not limited to one column on one side. For example, such grooves may be aligned in two columns or more on one side.

In addition, the slider 2 has rolling-element return paths 13, which consist of through holes that are positioned in parallel with the rolling-element rolling paths 14 to pass through in the axial direction, at the top portion of the slider block 2A. The rolling-element return paths 13 will be explained in detail.

Meanwhile, the end caps 2B, 2B having the substantially U-shaped sectional shape have a curved path (not shown), via which the rolling-element rolling path 14 communicates with the rolling-element return path 13 that is provided in parallel with rolling-element return paths 13, on the contact surface to the slider block 2A (back surface) respectively. Almost annular rolling-element circulation paths are constructed by the rolling-element rolling paths 14, the rolling-element return paths 13, and the curved paths provided to both ends. A large number of rolling elements 3 made of steel balls, for example, are charged rollably in the rolling-element circulation paths.

When the slider 2 fitted to the guide rail 1 is moved along the guide rail 1 in the axial direction, the rolling elements 3 moves in the same direction as the slider 2 with respect to the guide rail 1 while rolling in the rolling-element rolling paths 14. Then, when the rolling elements 3 come up to one end of the rolling-element rolling path 14, they are picked up from the rolling-element rolling path 14 by a tongue portion (not shown) provided in the end cap 2B and then fed to the curved path.

When the rolling elements 3 enter into the curved path, they make a U-turn along the curved path to enter into the rolling-element return path 13, and then they reach the curved path on the opposite side through the rolling-element return path 13. Then, the rolling elements 3 make the U-turn once again to return to the rolling-element rolling path 14, and repeat such circulation in the rolling-element circulation path.

Here, the above rolling-element return paths 13 will be explained hereunder. A concave portion 20 is provided to a top portion of the slider block 2A. The concave portion 20 is opened on the top portion of the slider block 2A between both ends in the axial direction. A separator 22 that extends in the axial direction is arranged in the center of the concave portion 20 to partition the concave portion 20 into two portions. These portions constitute the rolling-element return paths 13, 13 respectively. Then, the opening portion of the concave portion 20 that is opened on the top surface of the slider block 2A is covered with a cover member 24 and closed after the rolling elements 3 are charged, whereby the linear-motion device is brought into the available state.

Figure 3:
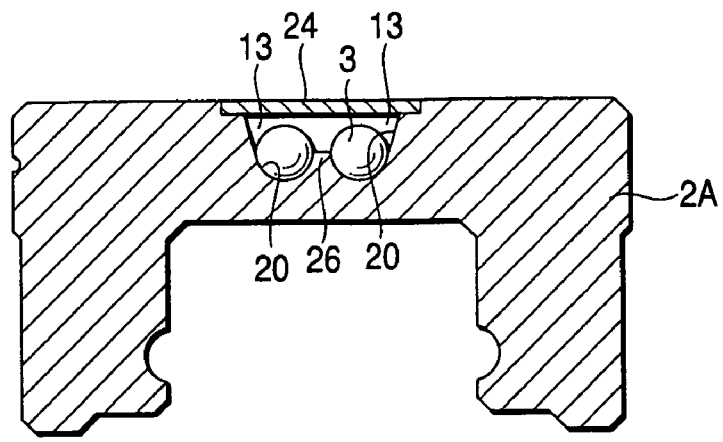
FIG. 3 is a sectional view of a slider block to explain a variation of the present embodiment.
Figure 4:
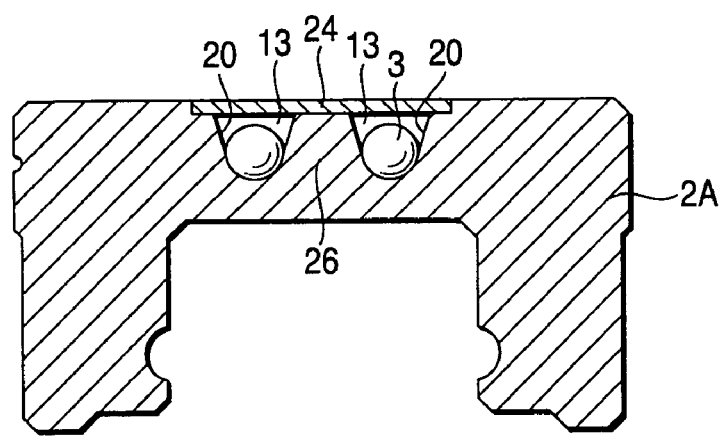
FIG. 4 is a sectional view of a slider block to explain another variation of the present embodiment.

In the above example, two rolling-element return paths 13, 13 are formed by partitioning one concave portion 20, which is provided on the slider block 2A, into two portions by the separator 22. In this case, as shown in FIG. 3 and FIG. 4 that are sectional views showing the slider block 2A only, two concave portions 20, 20 each constituting the rolling-element return path 13 may be provided on the slider block 2A. Normally the slider block 2A is formed by the drawing process. But the slider block 2A, in which a large convex portion 26 is formed between two concave portions 20, 20 to have a long distance between both concave portions 20, 20, as shown in FIG. 4, is formed by the cutting process because it is difficult to form such slider block by the drawing process. However, as shown in FIG. 3, the slider block 2A, in which the convex portion 26 formed between two concave portions 20, 20 is small, can be formed by the drawing process like the usual case.

Figure 5:
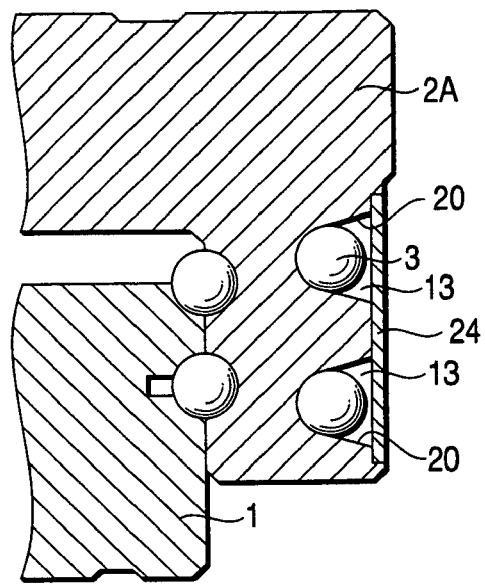
FIG. 5 is a sectional view of the linear-motion device to show a variation of an alignment position of a rolling element return path.
Figure 6:
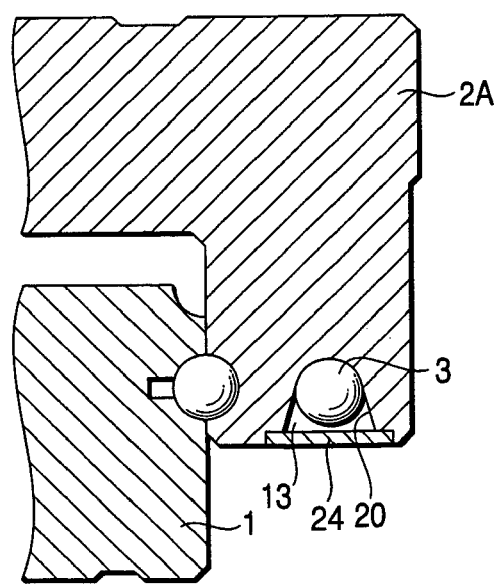
FIG. 6 is a sectional view of the linear-motion device to show another variation different from the example in FIG. 5.

In the above example, the concave portion 20 is provided on the top portion of the slider block 2A, and the concave portion 20 is opened on the top surface of the slider block 2A. In this case, as shown in fragmental sectional views of FIG. 5 and FIG. 6, the concave portions 20 that open on a side surface or a bottom surface of the slider block 2A may be provided to form the rolling-element return paths 13, 13.

Next, such linear-motion device manufacturing method (assembling method) will be explained hereunder.

The end caps 2B, 2B and the side seals 5, 5 are fitted to both end portions of the slider block 2A in the axial direction, and then the separator 22 is fitted to the inside of the concave portion 20 that opened on the top surface. Then, the slider 2 is fitted relatively movably with respect to the guide rail 1, then an appropriate amount of rolling elements 3 are charged into the rolling element circulation path from the opening portion of the concave portion 20 (which corresponds to a rolling-element introducing port as a constituent matter of the present invention), and then the opening portion is covered with the cover member 24 to close, whereby the linear-motion device is completed.

If the linear-motion guide bearing is assembled in this manner, the rolling elements are charged after the slider 2 is fitted to the guide rail 1. Therefore, there is no possibility that the tongue portion is subjected to the damage in the assembling operation.

Also, since the rolling elements 3 are charged from the opening portion on the outer surface of slider 2, the charging operation of the rolling elements becomes very easy regardless of whether or not the retainer is employed. In particular, if the charging of the rolling elements is carried out while directing the opening portion to the upward, the charging operation can be made extremely easy. In addition, since the operation for fitting the slider, in which the rolling elements have been charged into the rolling-element circulation path, to the guide rail is not executed, there is no chance that the rolling elements are fallen off during the assembling. According to the above, a time and a cost required to assemble the linear-motion device can be reduced considerably.

Further, an amount of charged rolling elements 3 can be checked at the time of charging via the opening portion of the concave portion 20 with the eye. Therefore, it can be checked that an appropriate amount of rolling elements 3 has been charged.

Figure 7A:
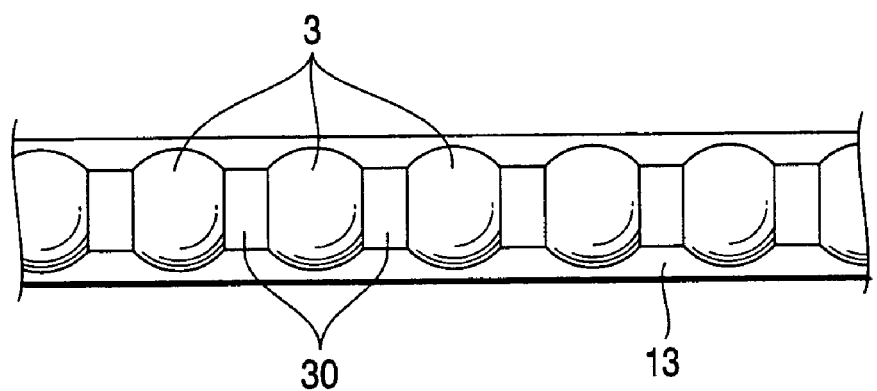
FIGS. 7 (A) and (B) are enlarged fragmental views showing a configuration of the linear-motion device when spacers are interposed between respective rolling elements; interposed between respective rolling elements.
Figure 7B:
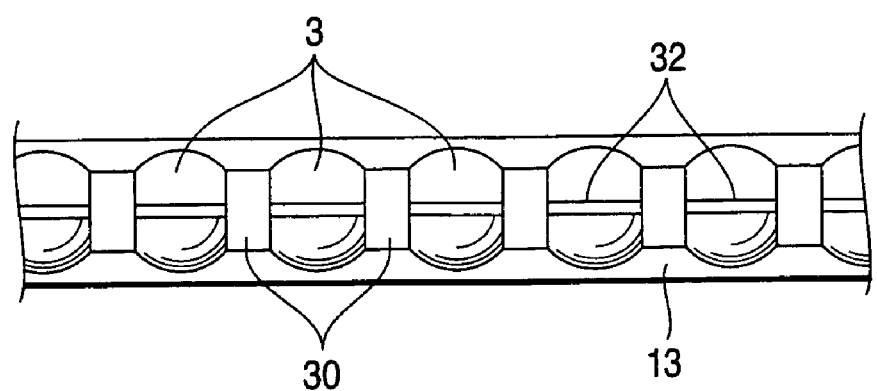
Figure 8:
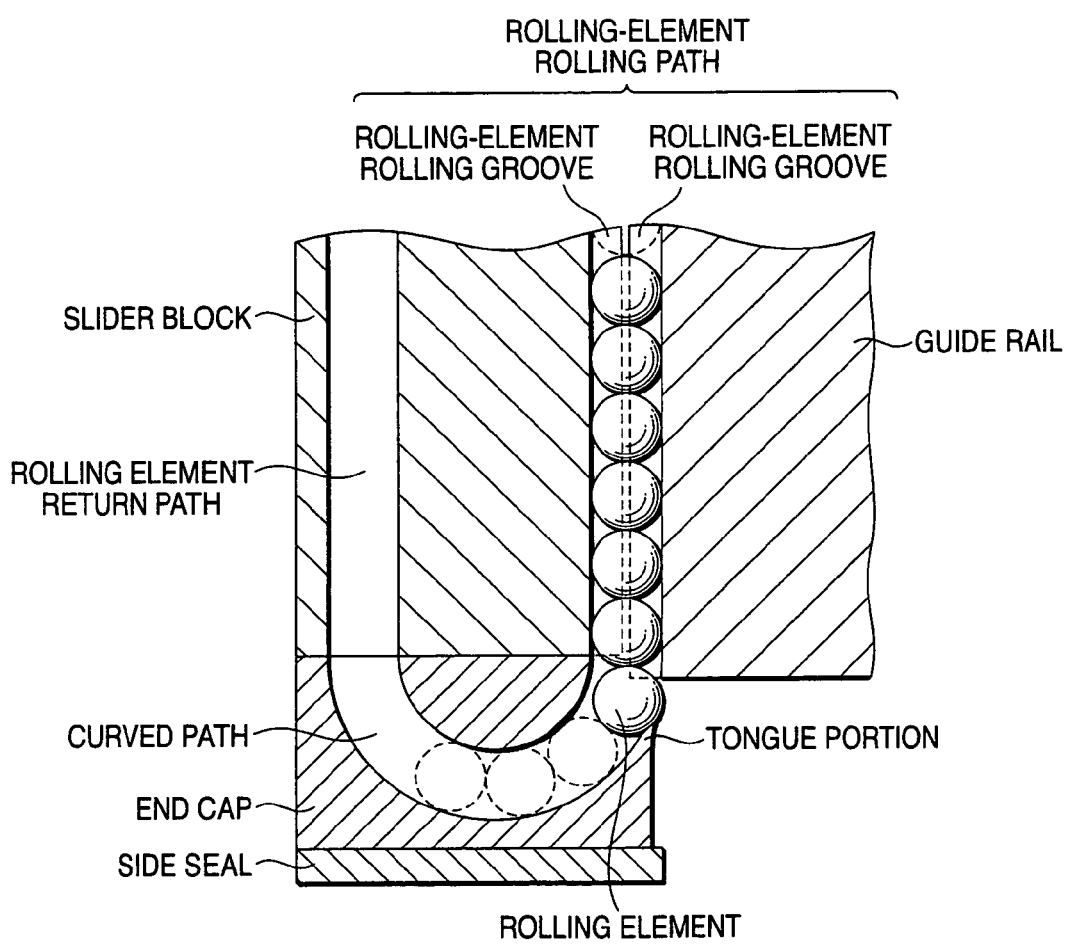
FIG. 8 is a fragmental sectional view explaining a tongue portion damaging mechanism in the linear-motion device manufacturing method in the prior art.

Furthermore, as shown in enlarged fragmental views of FIG. 7, even if the rolling elements 3 are charged by interposing spacers 30 between respective rolling elements 3, the rolling elements 3 and the spacers 30 can be charged while directing the opening portion to the upward. Thus, the charging operation can be made very easy. Also, it can be confirmed during the charging operation with the eye via the opening portion of the concave portion 20 whether or not the spacers 30 can be interposed between the rolling elements 3 without fail. In this case, the spacers 30 may be formed as a separate body respectively, as shown in FIG. 7A, otherwise the spacers 30 may be formed to be coupled by a coupling body 32 respectively, as shown in FIG. 7B.

In this case, if the slider 2 is fitted to the guide rail 1 by fitting temporarily a provisional guide rail 1*b* (which has the substantially same outer shape as the guide rail 1, to which the slider 2 is fitted temporarily, and to which the slider 2 can be fitted relatively movably in the axial direction) and then transferring the slider 2 to the guide rail 1 from the provisional guide rail 1*b*, procedures will be taken as follows.

First, the end caps 2B, 2B and the side seals 5, 5 are fitted to both end portions of the slider block 2A in the axial direction, and then the separator 22 is fitted to the inside of the concave portion 20 that opened on the top surface. Then, the slider 2 is fitted relatively movably with respect to the provisional guide rail 1*b*, then an appropriate amount of rolling elements 3 are charged into the rolling element circulation path from the opening portion of the concave portion 20, and then the opening portion is covered with the cover member 24 to close.

Then, this provisional guide rail 1*b* is aligned to continue to the guide rail 1. That is, the provisional guide rail 1*b* and the guide rail 1 are aligned to form a straight line in the axial direction. In this case, end portions of them may be brought into contact with each other, otherwise the provisional guide rail 1*b* may be positioned next to the guide rail 1 not to come into contact with each other. Then, the slider 2 is slid from the provisional guide rail 1*b* to the guide rail 1, so that the slider 2 that is fitted to the provisional guide rail 1*b* can be moved to the guide rail 1.

If the linear-motion device is assembled in this manner, following advantages can be achieved in addition to the above advantages that are achieved when the provisional guide rail 1*b* is not employed. In other words, if the slider 2 in which the rolling elements 3 have already been charged is moved from the provisional guide rail 1*b* to the guide rail 1, the rolling elements 3 are moved not in zigzags but smoothly. Therefore, the tongue portion is never damaged when the rolling elements 3 are passed through near the tongue portion.

In this case, the present embodiment shows merely an example of the present invention. The present invention is not limited to the present embodiment in details of the configuration, etc. of the linear-motion device. For example, the example in which the balls are used as the rolling elements is explained in the present embodiment. But the present invention can be applied to the linear-motion device that employs rollers.

Embodiments of the present invention will be explained with reference to the drawings hereinafter.

Figure 9:
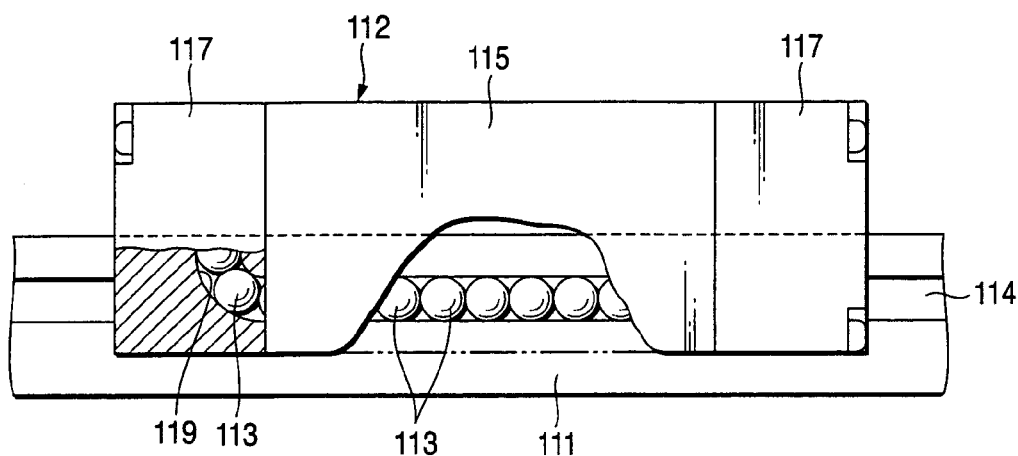
FIG. 9 is a side view of a linear-motion device according to a second embodiment of the present invention.
Figure 10:
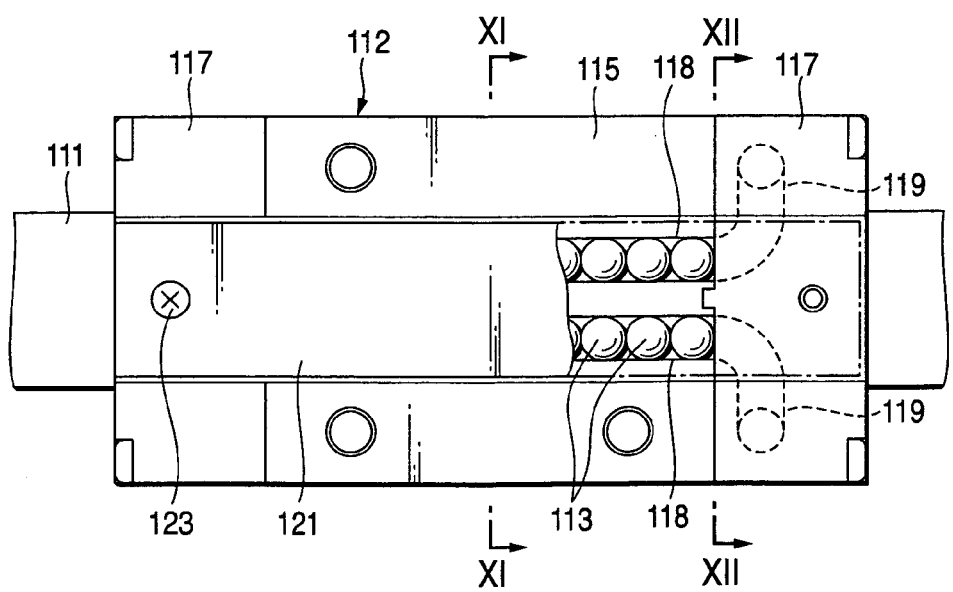
FIG. 10 is a plan view of the linear-motion device according to the second embodiment of the present invention.
Figure 11:
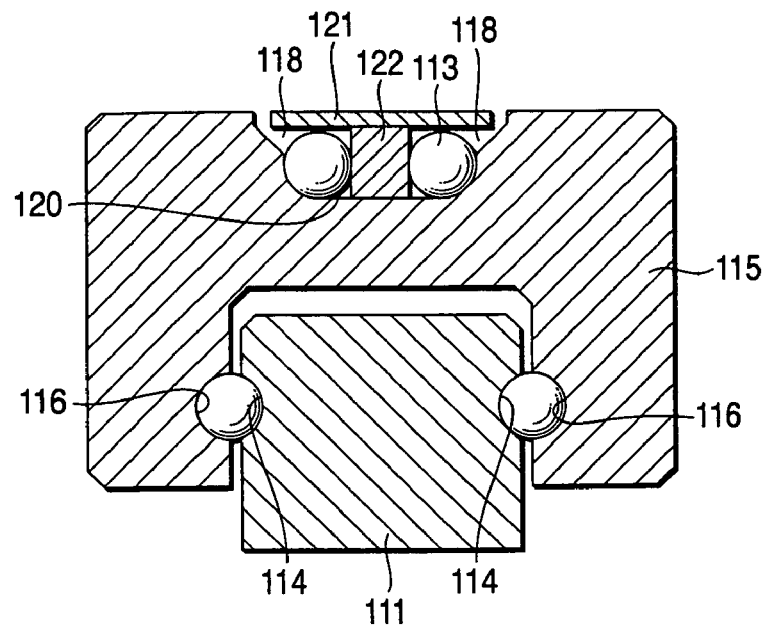
FIG. 11 is a sectional view taken along a XI-XI line in FIG. 10.
Figure 12:
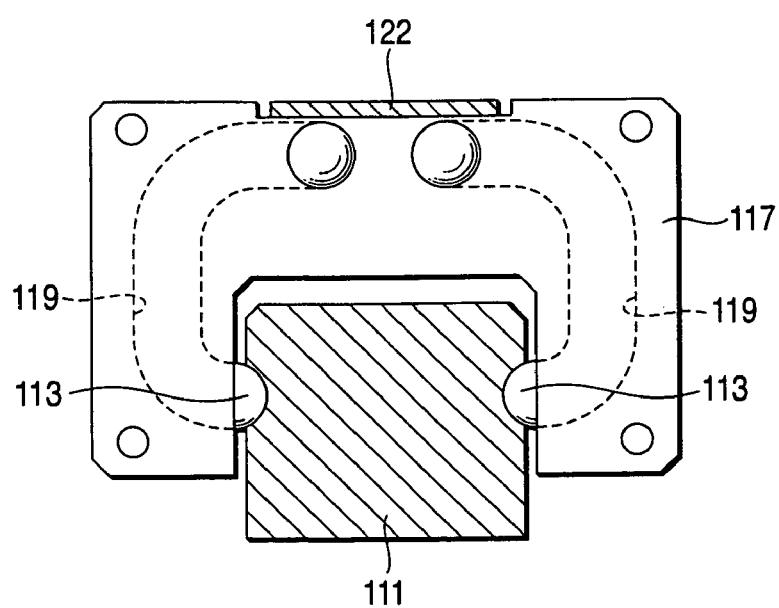
FIG. 12 is a sectional view taken along a XII-XII line in FIG. 10.

FIG. 9 to FIG. 12 are views explaining a second embodiment of the present invention. FIG. 9 is a side view of a linear-motion device according to a second embodiment of the present invention, FIG. 10 is a plan view of the linear-motion device according to the same embodiment, FIG. 11 is a sectional view taken along a XI-XI line in FIG. 10, and FIG. 12 is a sectional view taken along a XII-XII line in FIG. 10.

As shown in FIG. 9 and FIG. 10, the linear-motion device according to the second embodiment comprises a guide rail 111, a slider 112 provided onto the guide rail 111 relatively movably, and a large number of spherical rolling elements 113 used to cause this slider 112 to relatively move in the longitudinal direction of the guide rail 111. Rolling-element rolling grooves 114 are formed on side surfaces of the guide rail 111 along the longitudinal direction of the guide rail 111.

The slider 112 comprises a slider block 115 that has rolling-element rolling grooves 116, which oppose to the rolling-element rolling grooves 114 of the guide rail 111, on its inner side surfaces, and a pair of end caps 117 that close both-end openings of rolling-element rolling paths formed between the rolling-element rolling grooves 116 of the slider block 115 and the rolling-element rolling grooves 114 of the guide rail 111. Two rolling-element return paths 118 that return the spherical rolling elements 113, which have rolled in the rolling-element rolling paths, to their initial positions are formed in the slider block 115. In this case, two curved paths 119, which connect the rolling-element rolling paths formed between the rolling-element rolling grooves 114, 116 and the rolling-element return paths 118 formed in the slider block 115 to construct rolling-element circulation paths, are formed in the end caps 117 respectively.

As shown in FIG. 11, the rolling-element return paths 118 consist of a groove portion 120 formed on a top surface of the slider block 115 along the longitudinal direction of the guide rail 111, and a cover member 121 for covering this groove portion 120. A guide plate 122 for guiding the rolling elements 113 in the longitudinal direction of the guide rail 111 is provided in the center portion of the groove portion 120. In this case, the cover member 121 is fitted to top surfaces of the end caps 117, 117 by a plurality of set screws 123.

If the rolling-element return paths 118 are formed in the slider block 115 of the linear-motion device constructed in this manner, first the groove portion 120 whose width is larger than a diameter of the rolling element 113 is formed on the top surface of the slider block 115 by applying the drawing process to the slider block 115 to extend over the entire length of the slider block 115. Then, the cover member 121 for covering the groove portion 120 is fitted to the top surface of the slider block 115, whereby the rolling-element return paths 118 as shown in FIG. 11 are formed in the slider block 115.

In this manner, the rolling-element return paths 118 are formed in the slider block 115 by fitting the cover member 121, which covers the groove portion 120, is fitted to top surface of the slider block 115 after the groove portion 120 whose width is larger than a diameter of the rolling element 113 is formed on the top surface of the slider block 115 by the drawing process to extend over the entire length of the slider block 115. Thus, the rolling-element return paths 118 can be formed not to apply the drilling process to the slider block 115. As a result, a surface undulation precision of the rolling-element return paths 118 can be improved, and thus damage of the surface of the spherical rolling elements 113 caused by the rolling-element return paths 118 can be prevented. Also, the rolling-element return paths 118 can be formed on the slider block 115 not to require many steps, unlike the above prior art, and thus a cost and a time required for the formation of the rolling-element return paths can be reduced.

Figure 13:
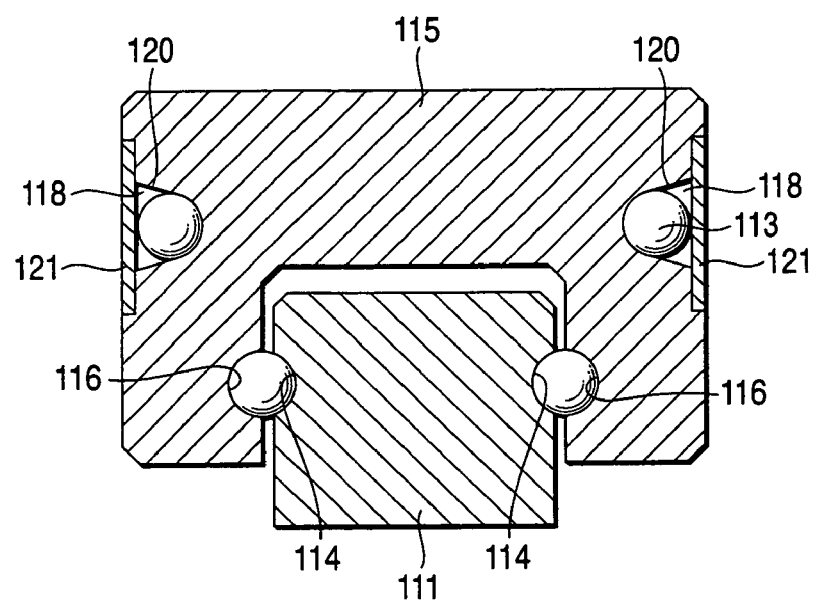
FIG. 13 is a side view of a linear-motion device according to a third embodiment of the present invention.
Figure 14:
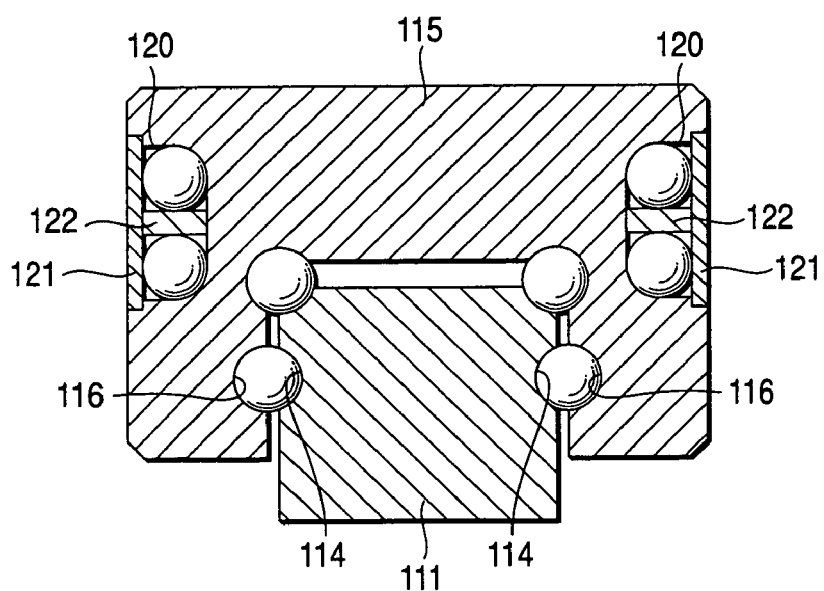
FIG. 14 is a side view of a linear-motion device according to a fourth embodiment of the present invention.

In the above second embodiment, the groove portion 120 is formed on the top surface of the slider block 115. But the groove portion 120 is not always formed on the top surface of the slider block 115. Like a third embodiment shown in FIG. 13, the groove portion 120 may be formed on outer side surfaces of the slider block 115. Also, in the second and third embodiments, two rolling-element return paths 118 are formed on the slider block 115. Like a fourth embodiment shown in FIG. 14, if four rolling-element rolling grooves 114 are formed in total on the guide rail 111, four rolling-element return paths 118 may be formed in total on the slider block 115.

Figure 15:
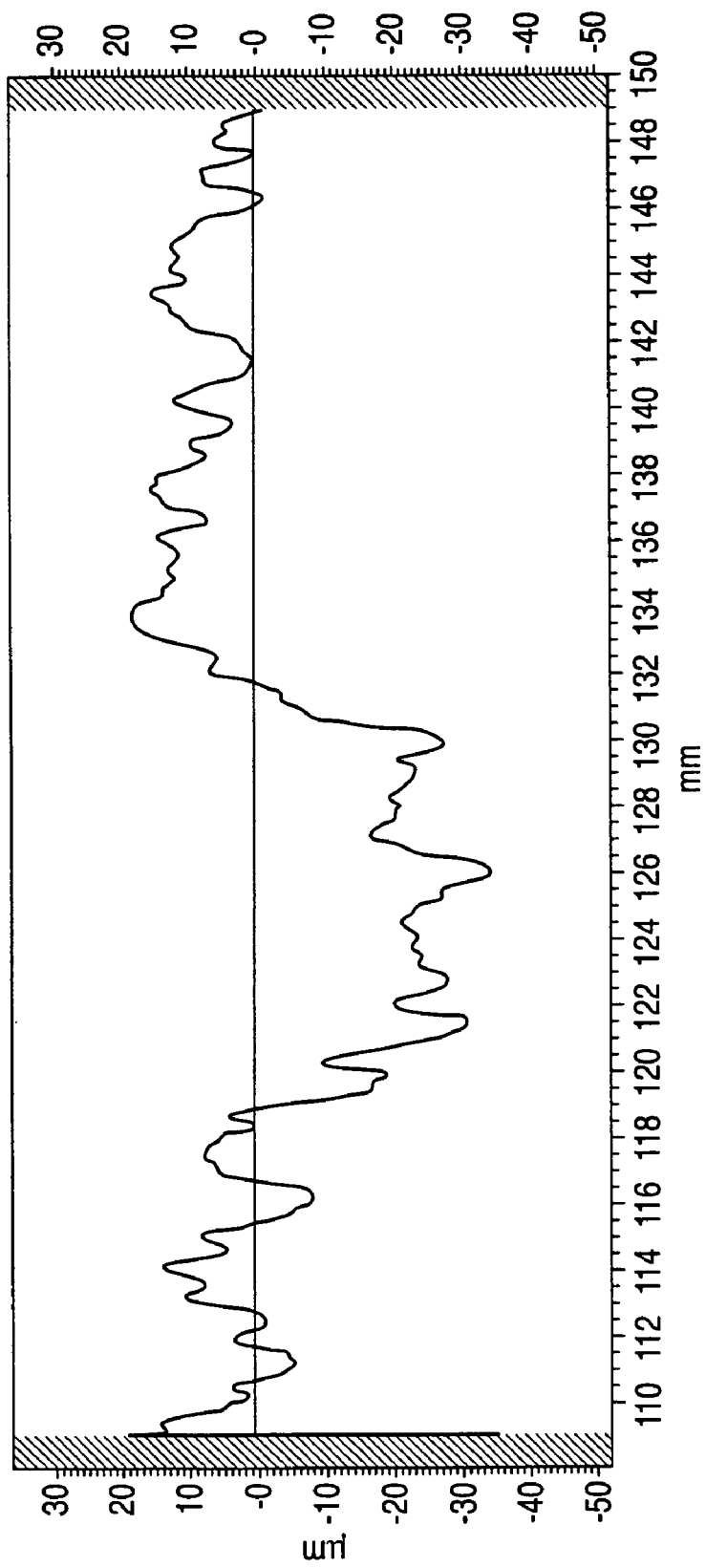
FIG. 15 is a graph showing measured results of a surface undulation precision of rolling-element return paths when such rolling-element return paths are formed on the slider block by the drilling process.
Figure 16:
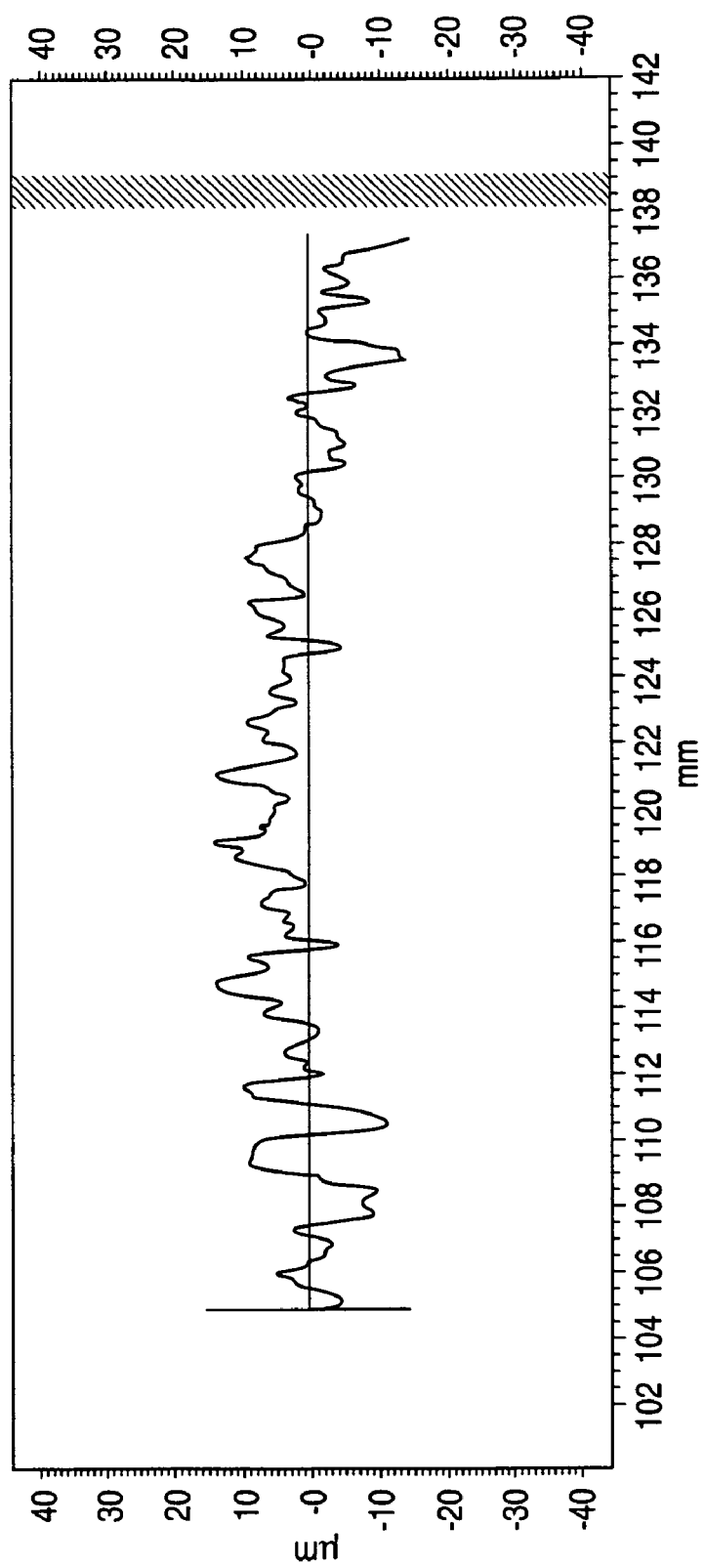
FIG. 16 is a graph showing measured results of a surface undulation precision of rolling-element return paths when such rolling-element return paths are formed on the slider block by the method of the present invention.

FIG. 15 is a graph showing measured results of a surface undulation precision of the rolling-element return paths when such rolling-element return paths are formed in the slider block by the drilling process. FIG. 16 is a graph showing measured results of a surface undulation precision of the rolling-element return paths when such rolling-element return paths are formed in the slider block by the method of the present invention.

As can be seen from FIG. 15 and FIG. 16, a deviation of the surface undulation precision was about ±50 μm if the rolling-element return paths are formed in the slider block by the drilling process, whereas a deviation of the surface undulation precision was about ±20 μm in the case of the present invention. As a result, if the cover member 121 for covering the groove portion 120 is fitted to the outer surface of the slider block 115 after the groove portion 120 whose width is larger than an outer diameter of the rolling element 113 is formed on the outer surface of the slider block 115 to extend over the entire length of the slider block 115, the rolling-element return paths having the small deviation of the undulation precision can be formed on the slider block.

A fifth embodiment of the present invention will be explained with reference to FIG. 17 to FIG. 22 hereinafter.

Figure 17A:
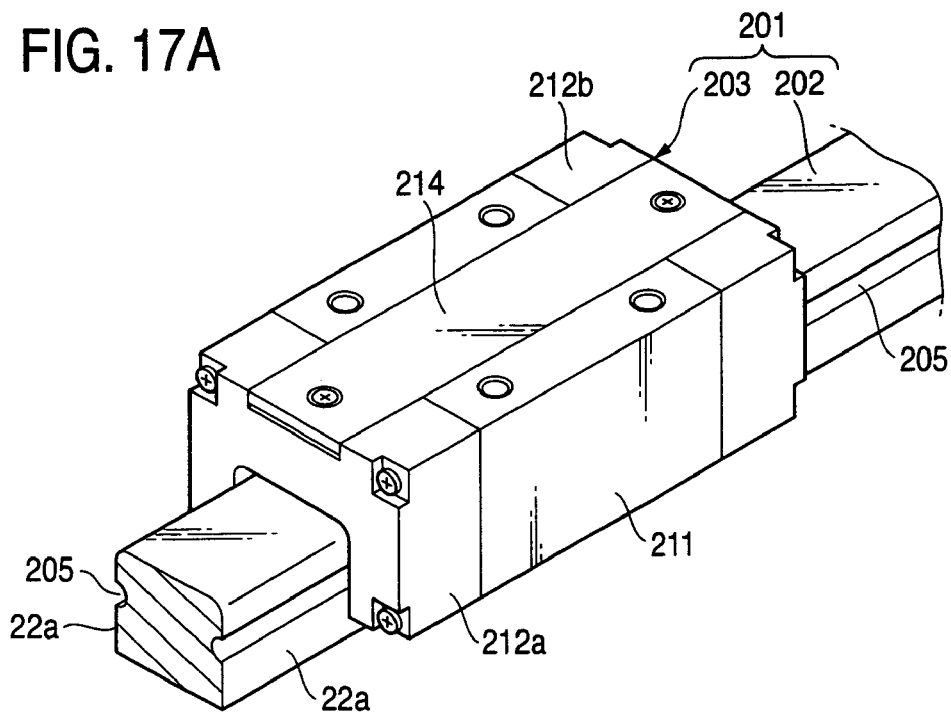
FIG. 17A is a perspective view showing a linear-motion device according to a fifth embodiment of the present invention.
Figure 17B:
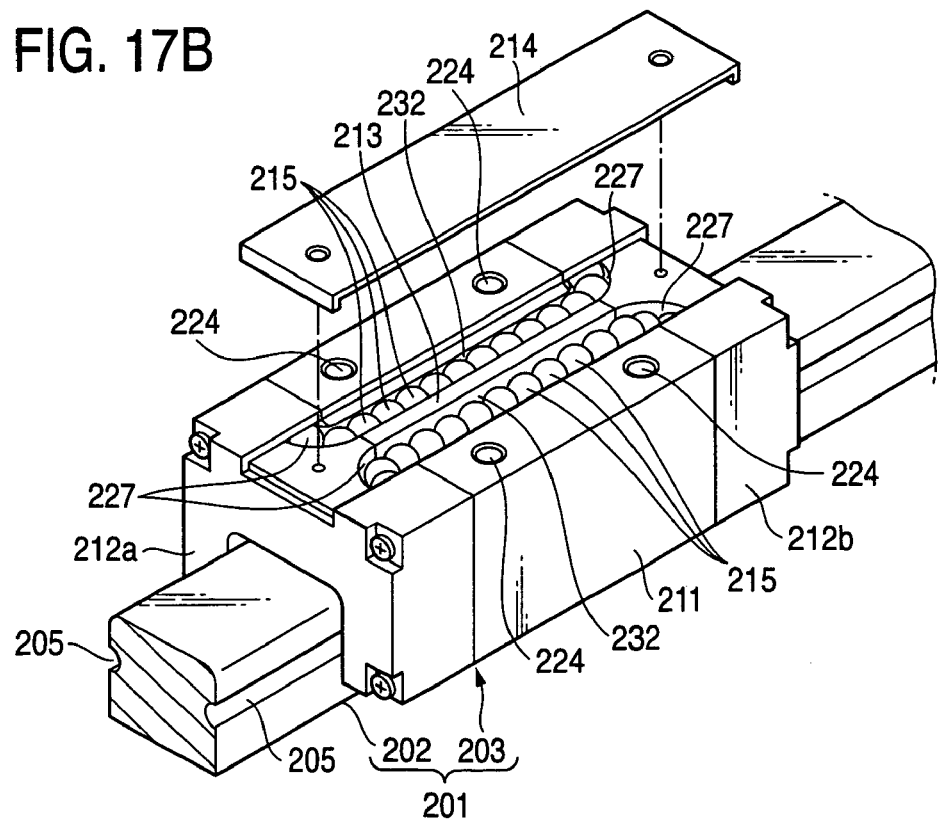
FIG. 17B is a perspective view showing the linear-motion device that is partially exploded.
Figure 18A:
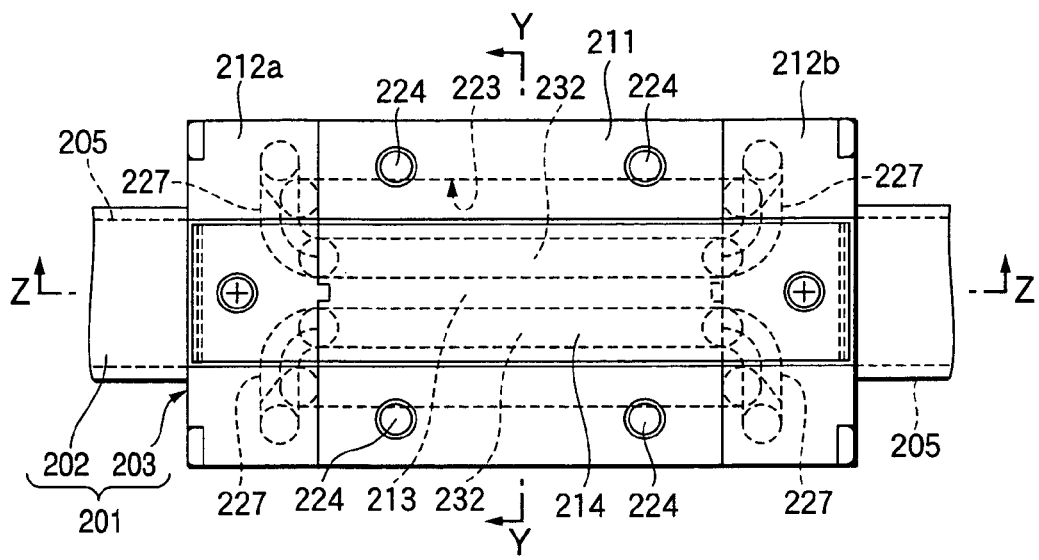
FIG. 18A is a plan view showing the linear-motion device in FIG. 17A.
Figure 18B:
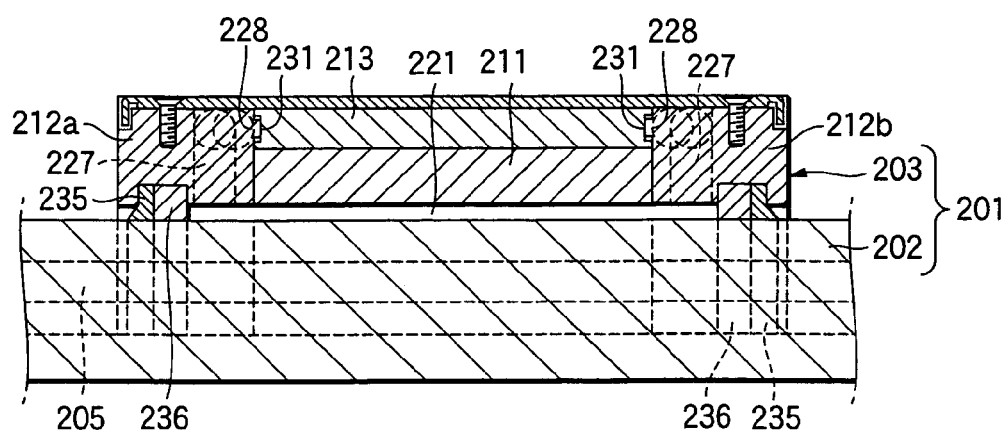
FIG. 18B is a sectional view showing a cross section taken along a Z-Z line in FIG. 18A.
Figure 19:
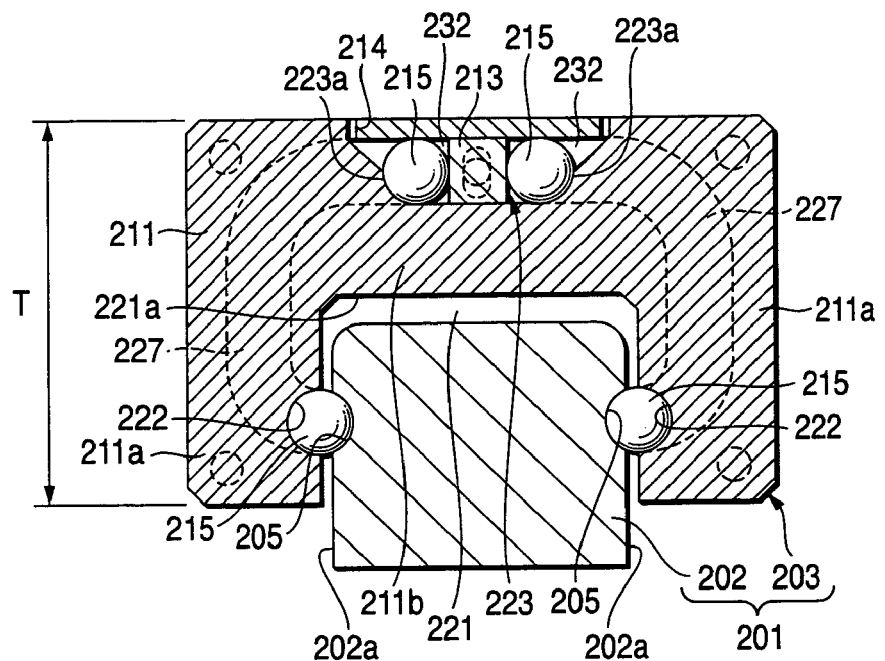
FIG. 19 is a sectional view showing a cross section taken along a Y-Y line in FIG. 18A.

In FIG. 17 to FIG. 19, a linear-motion device denoted by a symbol 201 (referred simply to as a "bearing unit" hereinafter) constitutes a linear guide, and comprises a guide rail 202 and a slider 203.

The guide rail 202 made of steel member has rolling-element rolling paths 205 that extend long in the axial direction and make a pair in parallel with each other. These rolling portions 205 are formed of grooves that extend in the axial direction on at least both side surfaces 202a of the guide rail 202. Respective rolling-element rolling paths 205 are finished by the grinding process.

The slider 203 has a slider block 211, a pair of end caps 212a, 212b, a separator 213 acting as a separator portion that is made of different member from the slider block 211, for example, a cover 214, and balls 215 made of steel balls serving as a number of rolling elements.

Figure 20:
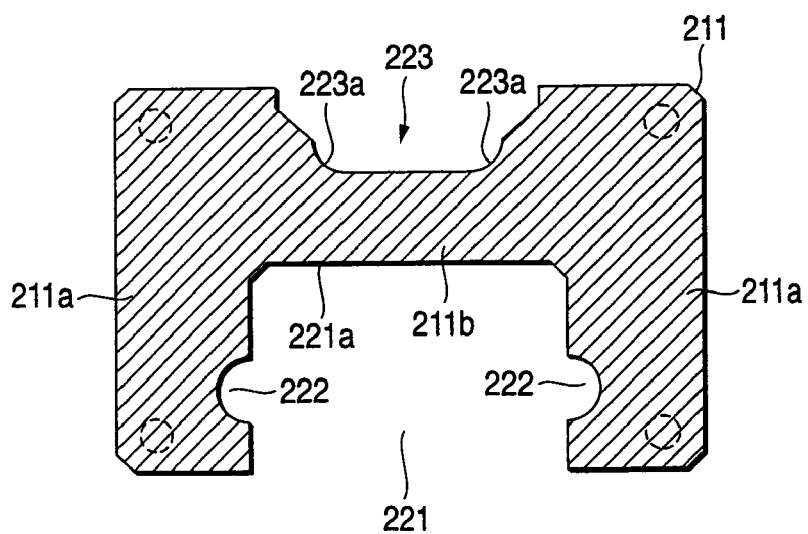
FIG. 20 is a sectional view showing a slider block provided to the slider of the linear-motion device in FIG. 17.

The slider block 211 is formed by cutting the drawn material, which is obtained by applying the drawing process to the steel material, into a predetermined length and then applying a predetermined process to such drawn material. As shown in FIG. 19 and FIG. 20, the slider block 211 has a pair of sleeve portions 211a for defining a rail fitting recess 221 that is fitted onto the guide rail 202 and a coupling portion 211b for connecting these sleeve portions 211a, and has a substantially U-shaped sectional shape.

Rolling-element rolling paths 222, which extend in the longitudinal direction of the slider block 211, are formed on surfaces of the sleeve portions 211a that oppose to the side surfaces 202a of the guide rail 202 in the situation that the slider block 211 is fitted onto the guide rail 202. A pair of these rolling-element rolling paths 222 are formed by the grooves, which are opened to face to the rail fitting recess 221 of the slider block 211 and both ends of which are opened in the extending direction, and are finished by the grinding process. These rolling-element rolling paths 222 are provided at positions that oppose to the rolling-element rolling paths 205 of the guide rail 202 in the situation that the slider block 211 is fitted onto the guide rail 202.

As shown in FIG. 20, a ball rolling groove 223 used to form rolling-element return paths 232, described later, is provided to a surface, which does not face to the rail fitting recess 221 of the slider block 211, so as to extend linearly in the longitudinal direction (moving direction) of the slider block 211. In the resent embodiment, the ball rolling groove 223 is provided to the surface that is opposite to one surface of the coupling portion 211b, which constitutes an innermost surface 221a of the rail fitting recess 221. In other words, the ball rolling groove 223 is positioned in the center portion of the slider block 211 in the width direction and is formed to dig the coupling portion 211b from the surface side. The ball rolling groove 223 is opened to the surface of the slider block 211, and also both ends of the ball rolling groove 223 are opened in the extending direction.

The ball rolling groove 223 has ball rolling surfaces 223a at both corner portions in the width direction respectively. A pair of ball rolling surfaces 223a are formed as a circular-arc surface that comes into contact with the ball 215, described later, in an angle range of almost 90 degree respectively. Side surfaces of the ball rolling groove 223 positioned near the opened end are inclined mutually oppositely, so that a width of the ball rolling groove 223 is widened gradually toward the surface of the slider block 211. According to this configuration, the contact portion of the ball 215 to the rolling-element return paths 232, described later, can be reduced and thus the rolling friction can be reduced.

Both the ball rolling groove 223 and the rolling-element rolling paths 222, which extend in the moving direction of the slider block 211 in parallel with each other, are formed simultaneously with the drawing process of the slider block 211. In this case, in the present invention, the ball rolling groove 223 and the rolling-element rolling paths 222 can also be formed by the cutting process employing the grinding machine that uses the rotating grindstone as the cutting tool or the milling machine that uses the form milling cutter as the cutting tool. In FIG. 17 and FIG. 18A, a symbol 224 denotes a screwed hole used to couple a table (not shown) that is put on the slider 203.

Figure 21:
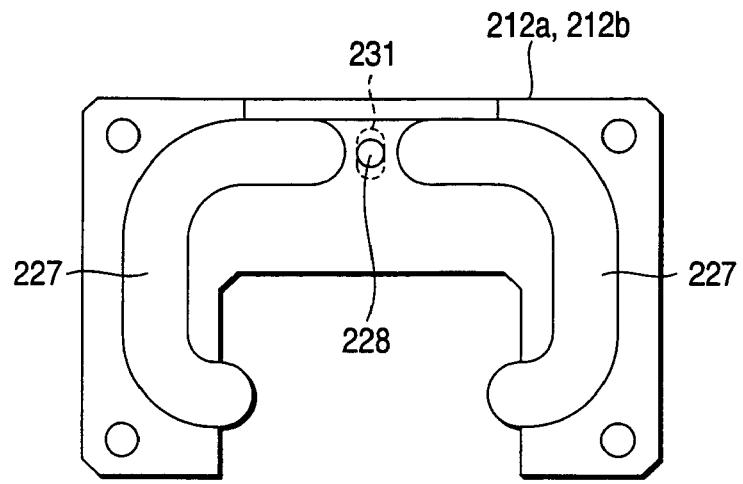
FIG. 21 is a front view showing end caps provided to the slider of the linear-motion device in FIG. 17.

The end caps 212a, 212b made of metal, synthetic resin, or the like have the almost same shape as a sectional shape of the slider block 211 respectively, and are coupled to both ends of the slider block 211 in the longitudinal direction, i.e., both ends in the moving direction, by plural screws respectively, and provided to close/cover both ends of the ball rolling groove 223 and the rolling-element rolling paths 222 in the longitudinal direction. As shown in FIG. 21, a pair of connecting ball rolling portions 227 are provided to the surfaces of these end caps, which come into contact with the slider block 211, symmetrically in the width direction. The ball rolling portions 227 are formed by a groove, which is opened to the contact surface to the slider block, respectively.

One ends of both ball rolling portions 227 of the end cap 212a are connected to one ends of both ball rolling grooves 223 in the longitudinal direction respectively, while the other ends of both ball rolling portions 227 of the end cap 212a are connected to one ends of both rolling-element rolling paths 222 in the longitudinal direction respectively. One ends of both ball rolling portions 227 of the end cap 212b are connected to the other ends of both ball rolling groove 223 in the longitudinal direction respectively, while the other ends of both ball rolling portions 227 of the end cap 212b are connected to the other ends of both rolling-element rolling paths 222 in the longitudinal direction respectively. In FIG. 18, symbols 235 and 236 denote a plate-like seal and a lubricant supplying member, which are buried in the concave recess portions of the end caps 212a, 212b.

The separator 213 is a partition plate having the same length as the slider block 211, and is arranged in the ball rolling groove 223 by coupling both end portions in the longitudinal direction to a pair of end caps 212a, 212b respectively. The ball rolling groove 223 is divided by the separator 213 in the width direction of the slider block 211.

Figure 22:
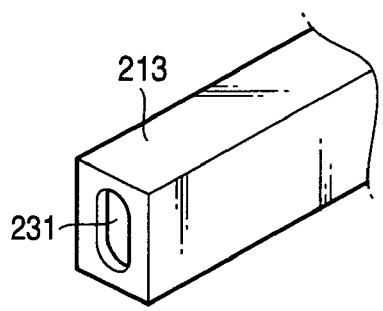
FIG. 22 is a perspective view showing one end portion of a separator provided to the slider of the linear-motion device in FIG. 17.

The coupling of the separator 213 and the end caps 212a, 212b is implemented by the concave-convex fitting. In more detail, as shown in FIG. 18B and FIG. 21, almost oval-shaped coupling convex portions 228 that are positioned in the center portion in the width direction to protrude from the contact surface are formed integrally in the end caps 212a, 212b. As shown in FIG. 18B and FIG. 22, almost oval-shaped coupling holes 231 are formed on both end surfaces of the separator 213 respectively. Both the coupling convex portions 228 and the coupling holes 231 extend in the thickness direction of the slider block 211 (a thickness dimension of the slider block 211 is shown in FIG. 19 by a symbol T). A length of the coupling hole 231 in the major-axis direction is longer than a length of the coupling convex portion 228 in the major-axis direction. Both side surfaces of the coupling convex portion 228 are formed in parallel mutually, and both side surfaces of the coupling hole 231 are also formed in parallel mutually. The coupling convex portion 228 and the coupling hole 231 are coupled to each other, and their width dimensions are set almost equal.

In the state that the separator 213 is arranged to divide the ball rolling groove 223 into two portions in the width direction, the end caps 212a, 212b are coupled to both ends of the slider block 211 respectively. According to this, the coupling convex portion 228 and the coupling hole 231 are fitted correspondingly and also the separator 213 is put between the end caps 212a, 212b and is fitted to the predetermined position.

In this case, as already described above, since respective widths and lengths of the coupling convex portion 228 and the coupling hole 231 are different, the separator 213 is never fitted at the false fallen posture because the wrong fitting direction is not selected, and thus the separator 213 can be fitted at the proper posture. In addition, since the coupling hole 231 is longer than the coupling convex portion 228, such coupling hole 231 can absorb variation in their height positions so as to eliminate interference between the coupling convex portion 228 and the coupling hole 231, so that both elements can be fitted to each other without fail and thus the defective In addition, since the width dimensions of the coupling convex portion 228 and the coupling hole 231 are set almost equal and their fitting is set tightly, the separator 213 can be arranged at a predetermined position not to move in the width direction. Therefore, generation of the noise due to the shake of the separator 213 can be prevented.

The separator 213 can be formed of metal, synthetic resin, or the like. In the present embodiment, the separator 213 is formed of synthetic resin. Accordingly, in the fitting structure of the end portion, i.e., in the case of the present embodiment, the coupling hole 231 can be formed not to need the work of the coupling hole 231 at the same time when the separator 213 is formed.

The separator 213 can be formed of oil-impregnated material, e.g., oil-impregnated sintered alloy or oil-impregnated synthetic resin. It is preferable to employ the separator 213 formed of such material in the respect that, since the balls 215, described later, are brought into contact with the separator 213 when such balls are rolled in the ball-return rolling portions 232, described later, supply of the grease to the balls 215 can be automatically carried out. Therefore, either the number of times to supply the grease can be reduced or the maintenance of the grease can be omitted.

The ball-return rolling portions 232 are formed between side surfaces of the ball rolling groove 223, which have the ball rolling surfaces 223a, and the separator 213 in the ball rolling groove 223 respectively. A pair of ball-return rolling portions 232 extend linearly in the moving direction of the slider block 211 and are opened to the surface of the slider block 211.

A pair of ball-return rolling portions 232 positioned on both sides of the separator 213 are formed by a part of the ball rolling groove 223 respectively. Hence, one ends of the ball-return rolling portions 232 are connected to the connecting ball rolling portions 227 of one end cap 212a to communicate with them respectively, and the other ends of the ball-return rolling portions 232 are connected to the connecting ball rolling portions 227 of other end cap 212b to communicate with them respectively. Therefore, ball circulation paths are formed by the ball-return rolling portions 232, the connecting ball rolling portions 227, and the rolling-element rolling paths 222, all being communicated with each other. The depicted slider 203 has a pair of ball circulation paths. A number of balls 215 made of the steel balls are charged in respective ball circulation paths like a string of beads. These balls 215 take an infinite circulation motion in the ball circulation paths with the movement of the slider 203. The side surfaces of the separator 213 are used as ball rolling surfaces with respect to such moving balls 215.

The cover 214 is formed of metal, or synthetic resin. The cover 214 is arranged over the end caps 212a, 212b and covers the openings of the ball rolling groove 223 along the longitudinal direction to close them, and acts as a latch of the balls 215 from the ball-return rolling portions 232. Thus, a pair of ball-return rolling portions 232 that are opened to the surface of the slider block 211 are covered with a sheet of cover 214 respectively. This cover 214 is fixed to the end caps 212a, 212b by the screws respectively. The cover 214 is fixed by the screws, and holds the separator 213 between the innermost surface of the ball rolling groove 223 and the cover 214. The surface of the cover 214 is set slightly lower in level than the surfaces of the slider block 211 and the end caps 212a, 212b such that the cover 214 does not disturb the loading of the table (not shown).

The slider 203 having the above structure is assembled as follows. First, the seal 235 and the lubricant supplying member 36 are inserted into the concave recess portions provided to the end caps 212a, 212b and then the end caps 212a, 212b are fixed to the slider block 211 by the screws in this state respectively. Then, the slider 203 is fitted to the guide rail 202 by inserting the slider 203, which has been assembled into the semimanufactured goods as above, from the end surfaces of the guide rail 202, then the balls 215 are poured into a pair of ball-return rolling portions 232, which are opened to the surface of the slider block 211, from the upper side, and then a predetermined amount of balls 215 is installed into the slider 203 by feeding the balls 215 into the space between the rolling-element rolling paths 205, 222 while shaking the slider 203 laterally with respect to the guide rail 202. Then, the ball-return rolling portions 232 are covered with the cover 214 and then the slider 203 is assembled by fixing the cover 214 to the end caps 212a, 212b via the screws. In this assembled state, a large number of balls 215 are arranged between the opposing rolling-element rolling paths 205, 222, so that the slider 203 is provided relatively movably in the axial direction of the guide rail 202 via a number of balls 215 that roll between the opposing rolling-element rolling paths 205, 222. Then, in the above assembling procedures, since the balls 215 are charged into the ball circulation paths of the slider 203 not along the axial direction of the guide rail 202 in the state that one end cap is removed but from the upper side of the slider 203, the assembling characteristic can be improved.

As described above, the slider block 211 of the slider 203 has a pair of rolling-element rolling paths 222, and a pair of ball-return rolling portions 232 that are connected to the rolling-element rolling paths 222 individually via the connecting ball rolling portions 227 of the end caps 212a, 212b. Both the rolling portions 232 are formed by the grooves that are opened to the surface of the slider block 211. As a result, the drilling process for digging the elongate through holes in the slider block 211 by using the drill is not required to provide not only the rolling-element rolling paths 222 but also the rolling portions 232. In addition, the removing process of shavings produced by the drilling work and refuses produced by the heating process, the correcting process required when a level difference in the drilling process is large, etc. can be omitted.

In this manner, since the work for forming the ball rolling grooves 223 acting as the ball-return rolling portions 232 in the slider block 211 and the work for smoothing their inner surfaces can be facilitated, the working cost can be reduced. Accordingly, the cost of the slider 203 having the slider block 211 or the bearing unit 201 can be reduced.

Further, in the present embodiment, since the slider block 211 can be obtained by drawing the steel material, not only the rolling-element rolling paths 222 but also the ball rolling groove 223 acting as the ball-return rolling portions 232 can be formed simultaneously with this process. Thus, since particularly the ball rolling grooves 223 with a predetermined surface roughness can be formed without the cutting process for forming the ball rolling groove 223, the cost can be reduced further more.

Figure 23:
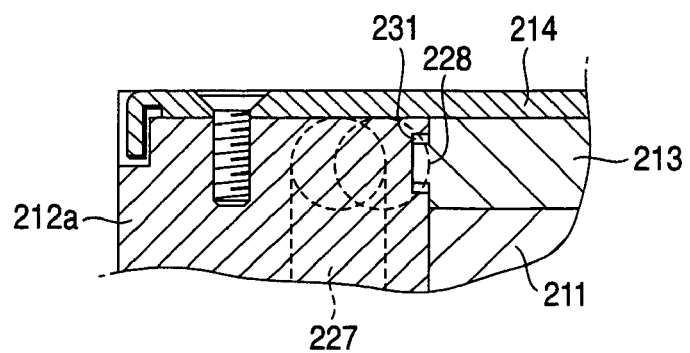
FIG. 23 is a sectional view showing a part of a slider of a linear-motion device according to a sixth embodiment of the present invention.

FIG. 23 shows a sixth embodiment of the present invention. Since this embodiment has basically the same configuration as the first, explanation of the configuration and the operation will be omitted by affixing the same symbols as those in the fifth embodiment to the same constituent portions, and thus only different portions will be explained hereunder. A different portion in the sixth embodiment from the fifth embodiment is a fitting structure of the separator 213.

That is, in the sixth embodiment, the separator 213 is fitted by providing the coupling convex portion 228 to the end surface of the separator 213 to protrude therefrom, forming coupling holes 231 in the end caps 212a, 212b, and then fitting them mutually. Then, the configurations except for the above explained points are identical to the fifth embodiment to contain the portions not shown in FIG. 23.

As a result, in the sixth embodiment, the same advantages as the fifth embodiment can be achieved and the subject of the present invention can be overcome.

Figure 24:
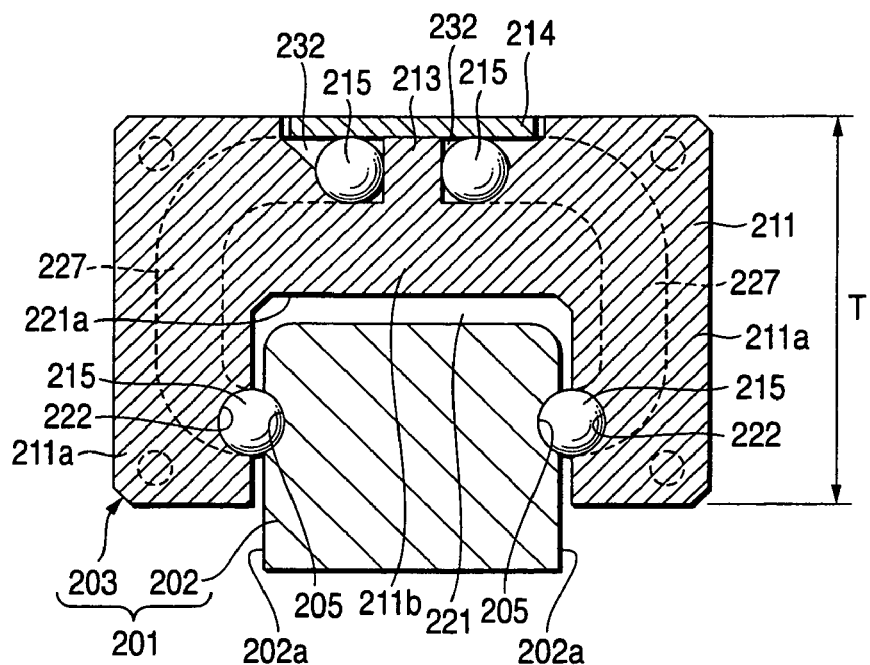
FIG. 24 is a sectional view showing a linear-motion device according to a seventh embodiment of the present invention.
Figure 25:
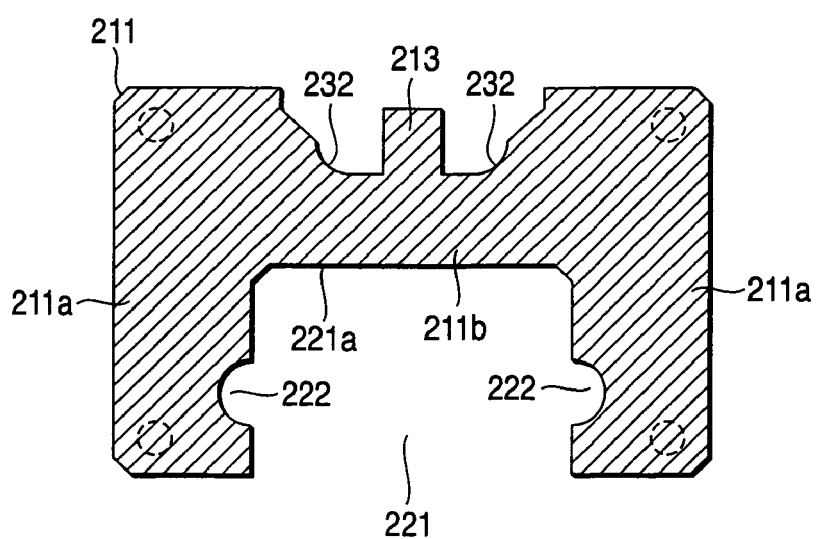
FIG. 25 is a sectional view showing a slider block provided to the slider of the linear-motion device in FIG. 24.

FIG. 24 and FIG. 25 show a seventh embodiment of invention. Since this embodiment has basically the same configuration as the fifth embodiment, explanation of the configuration and the operation will be omitted by affixing the same symbols as those in the fifth embodiment to the same constituent portions, and thus merely different portions will be explained hereunder. A different portion in the seventh embodiment from the fifth embodiment is configurations of the ball-return rolling portions and the separator.

In other words, in the seventh embodiment, the separator 213 is formed integrally with the slide main body 211, and the rolling-element return paths 232 consisting of the overall ball rolling grooves are formed on both sides of the separator 213 in the width direction respectively. Both the separator 213 and the rolling-element return paths 232 are formed according to the drawing formation of the slider block 211, and the side surfaces of the separator 213 are used as the ball guide surfaces. The opening of the ball rolling groove 223, which are opened to the surface of the slide main body 211 and extend in the longitudinal direction, is covered with the cover 214 that is arranged over a pair of rolling-element return paths 232 provided to put the separator 213 therebetween. Then, the configurations except for the above explained points are identical to the fifth embodiment to contain the portions not shown in FIG. 24 and FIG. 25.

As a result, in the seventh embodiment, the same advantages as the fifth embodiment can be achieved and the subject of the present invention can be overcome. In addition, in the seventh embodiment, since the separator portion is formed integrally with the slider block 211, reduction of the parts themselves of the separator 213 can be implemented and also the configuration and labor to fit the separator 213 can be omitted. Therefore, the reduction in cost can be achieved further more.

As described above, according to a linear-motion device of the present invention, the charging of rolling elements can be facilitated, and such a possibility can be eliminated that the rolling elements are fallen off during assembling, and such a possibility can be eliminated that the tongue portion is damaged during assembling.

As described above, according to the present invention, since the surface undulation precision of the rolling-element return paths can be improved, the surfaces of the rolling elements can be prevented from being damaged by the rolling-element return paths. Also, since the rolling-element return paths can be formed on the slider block without the need of many steps, a cost and a time required for the formation of the rolling-element return paths can be reduced.

The present invention is implemented as the embodiments explained as above and advantages set forth in the following can be achieved.

According to the inventions according to the aspects, the working for forming the rolling-element return path in the slider block can be made easy, and thus the slider of the linear-motion device can be provided inexpensively because of corresponding reduction in a working cost.

According to the invention according to the aspects, since the slider that can improve the workability of the slider block, as set forth in any one of the aspects, is provided, the linear-motion device can be provided at a low cost.

What is claimed is:

1. A linear-motion device comprising:

a slider provided onto a guide rail relatively movably; and a plurality of rolling elements for causing the slider to move relatively in a longitudinal direction of the guide rail;

whereby the slider comprising a slider block having rolling-element rolling grooves that oppose to rolling-element rolling grooves formed on the guide rail, and end caps that close both-end openings of the rolling-element rolling paths formed between the rolling-element rolling grooves on the slider block and the rolling-element rolling grooves on the guide rail, and rolling-element return paths for returning the rolling elements, which have rolled in the rolling-element rolling paths, are formed on the slider block, wherein the rolling-element return paths comprise a groove portion formed on a substantially planar portion of a top surface or an outer side surface of the slider block along the longitudinal direction of the guide rail and which splits the top surface or outer side surface into two portions on opposite sides of the groove portion, and a cover member for covering the groove portion, wherein the groove portion has a curved portion for accommodating a portion of each of the plurality of rolling elements, wherein a guide plate is provided in a center portion of the groove portion in such a manner that at least two rolling-element return paths are formed in the groove portion.

2. The linear-motion device according to claim 1, wherein the slider block is formed by applying a drawing process to a metal material.

3. The linear-motion device according to claim 1, wherein the slider block forms a rail fitting recess in order to fit onto the guide rail, a part of the rolling-element rolling paths are formed on the rail fitting recess, and the rolling element return paths are formed on surfaces of the slider block being other than the rail fitting recess.

4. The linear-motion device according to claim 1, wherein the guide plate is formed as a separator formed of different member from the slider block, and both ends of the separator are coupled to the end caps.

5. The linear-motion device according to claim 4, wherein coupling holes are provided on one of end portions of the separator and the both end caps, and coupling convex portions are provided on one of end portions of the separator and the both end caps so as to be opposed to the coupling holes, in order to fit the separator onto the both end caps.

6. The linear-motion device according to claim 5, wherein the coupling holes extend in a thickness direction of the slider block, the coupling convex portions extend over a shorter distance than lengths of the coupling holes in a same direction as the coupling holes, and fitting between the coupling holes and the coupling convex portions in a width direction of the slider block is set tightly in order to be free from moving the separator in a width direction.

7. The linear-motion device according to claim 4, wherein the separator is formed of synthetic resin.

8. The linear-motion device according to claim 4, wherein the separator is formed of oil-impregnated material.

9. The linear motion device according to claim 1, wherein the cover member is a substantially plate shaped member.

10. The linear motion device according to claim 1, wherein the groove portion is directly formed on the top or outer side surface of the slider block.

11. The linear motion device according to claim 1, wherein the groove portion comprises a surface on which said rolling-elements roll, wherein said surface is directly formed in the top or outer side surface of the slider block.

* * * * *